United States Patent [19]

Knudson

[11] Patent Number: 5,582,058
[45] Date of Patent: Dec. 10, 1996

[54] GIRDLING ARTICLE AND METHOD

[76] Inventor: Giltner J. Knudson, 2831 Nevis Cir., Costa Mesa, Calif. 92626

[21] Appl. No.: 370,894

[22] Filed: Jan. 10, 1995

[51] Int. Cl.⁶ .................................................. B21D 53/36
[52] U.S. Cl. ...................... 72/379.2; 248/74.3; 248/300
[58] Field of Search .................. 72/51, 379.2; 24/20 R, 24/21, 23 R; 248/74.3, 300

[56] References Cited

U.S. PATENT DOCUMENTS

| | | | |
|---|---|---|---|
| 1,896,898 | 2/1933 | Hildebrand | 348/300 |
| 1,941,892 | 1/1934 | Greve | 72/379.2 |
| 3,198,463 | 8/1965 | Loudon | 248/74.3 |
| 4,141,107 | 2/1979 | Sheiman et al. | 248/300 |

OTHER PUBLICATIONS

Moonlite Marine Corp., frontside and backside copies of a sheet showing an aladdin cleat.

*Primary Examiner*—Lowell A. Larson
*Attorney, Agent, or Firm*—Richard L. Gausewitz

[57] ABSTRACT

A method of forming a sheet metal article, and the resulting article, which includes causing a sheet metal blank to have a predetermined configuration such that the blank will bend, in part, into a predetermined cylindrical shape and diameter without need for dies or mandrels.

22 Claims, 2 Drawing Sheets

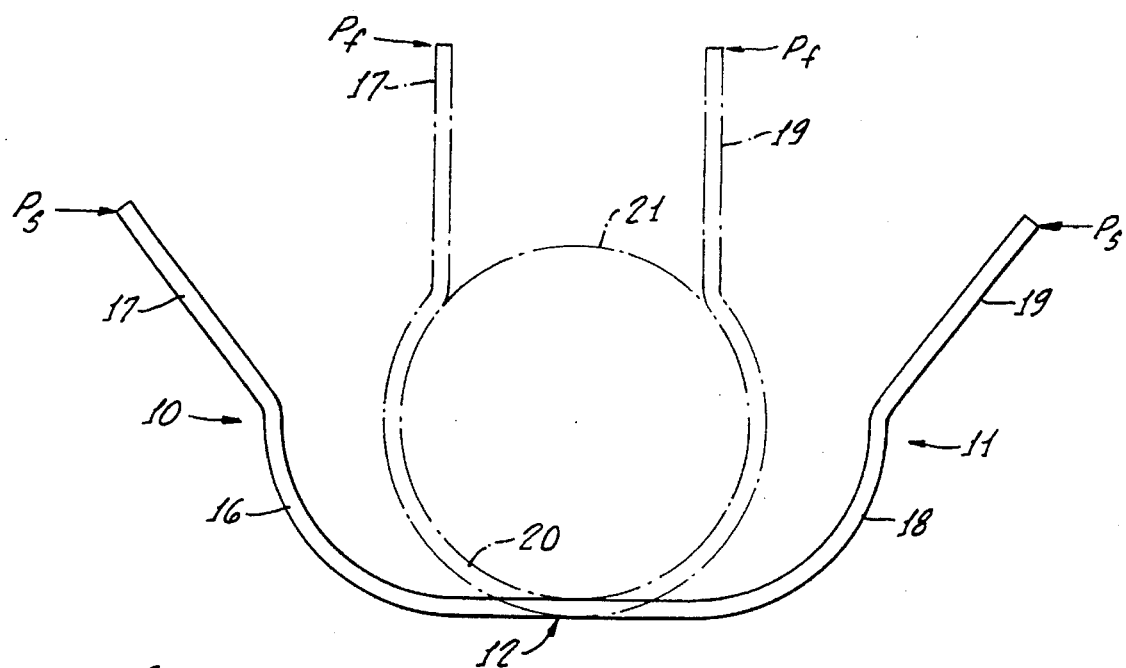
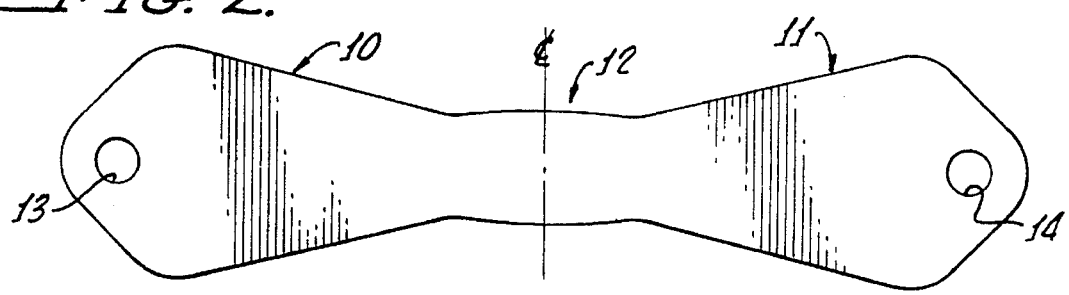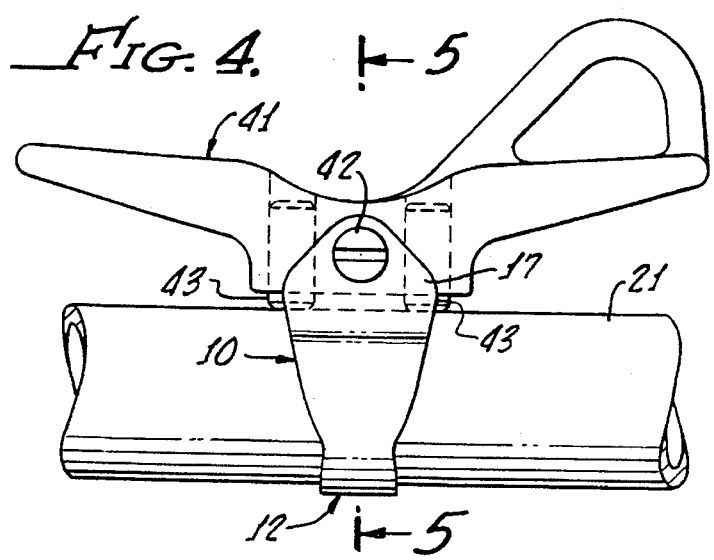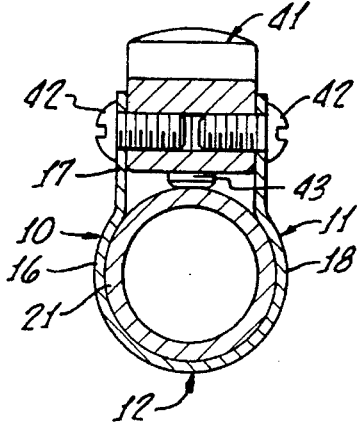

GIRDLING ARTICLE AND METHOD

BACKGROUND OF THE INVENTION

There are numerous types of sheet metal articles, in a large number of sizes, that are adapted to encircle or girdle something. These articles include (to state but a few examples) clamps, clips, hangers, mounts, brackets, etc., and they are adapted to encircle (to state but a few examples) rods, pipes, rails, cables, hoses, etc. Typically, the girdling articles are completely formed at a factory by being bent past their elastic limits, using male and female dies. In some cases, as (for example) in the case of "b" brackets, the articles are not fully formed at the factory but are adapted to be manually (or otherwise) bent in the field (place of installation, mounting or assembly) so as to encircle long products such as pipes and cables, etc. In this connection it is emphasized that there are many products relative to which it is not possible or practical to mount clamps, etc., thereon from the ends, because such products are either very long or have flanges, etc., that prevent such mounting.

In the case of the above "b" bracket example, the bending in the field typically results in shapes that are not geometric curves but instead are random shapes, hinge shapes, etc. Because of the disuniformity of bending relative to "b" brackets, the holes therein often do not line up with each other when the brackets are bent to closed condition, thus creating a problem relative to insertion (and turning) of a screw or bolt through the holes.

It would be a distinct step forward in the art if there could be created an encircling article such that bending in the field, without any mandrel or dies, does not result in random shapes but instead in desired geometric curved shapes that typically correspond (in shape and size) to the surface configurations of the encircled products.

It would be a further step forward if this bending in the field could in same instances be performed by a typical adult man or woman without use of tools.

SUMMARY OF THE INVENTION

In accordance with one aspect of the present invention, a piece of sheet metal (or bendable metal plate) is provided and is so shaped that sufficient force applied to spaced points of the sheet metal will cause the same to bend past its elastic limit into a portion of a curved geometric shape such as a cylinder, instead of bending randomly, all without need for mandrels or dies.

In accordance with another aspect of the invention, a portion of an elongate piece of sheet metal is formed at the factory into a portion of a curved geometric shape, such as a cylinder, that is desired for the end product in the field, while a second portion of such piece of sheet metal is not so formed at the factory. Such second portion is, instead, so constructed that when force is applied thereto in the field it will bend into the desired shape of the end product, without use of mandrels or dies. The first-mentioned and second portions are adjacent each other so that the factory-formed section and the field-formed section are a continuous curve.

In accordance with another aspect of the invention, a region of an elongate piece of sheet metal is caused to have a progressively changing width (progressively changing element length), and such progressively changing width is so constructed and calculated that application of force to the sheet metal at points remote from the progressively-changing-width region will cause such region to bend into a desired curved geometric shape such as a cylinder, without need for mandrels or dies.

In accordance with another aspect of the invention, a product is provided a part of which is made strong and not adapted to bend in the field, and another part of which is made less strong and adapted to bend in the field, such less-strong part having a configuration calculated to cause the bending to be into a predetermined desired curved geometric shape when force is applied to the sheet metal, without any need for mandrels or dies.

Another object is to provide, as one example of the present invention, an aladdin cleat that can be applied to a rail or stay of a sailboat or yacht by bending performed in part in the field.

BRIEF DESCRIPTION OF THE DRAWINGS

FIG. 1 is a two-position view showing the present girdling article in open position to which it is formed at the factory, and in closed position to which it is formed in the field;

FIG. 2 is a plan view of the girdling article when in flat condition, prior to any forming at the factory or in the field;

FIG. 4 is a side elevational view showing the girdling article as connected to an aladdin cleat and mounted on a long rail of a boat;

FIG. 5 is a transverse central sectional view taken on line 5—5 of FIG. 4;

DETAILED DESCRIPTION OF PREFERRED EMBODIMENTS

Figure 3:
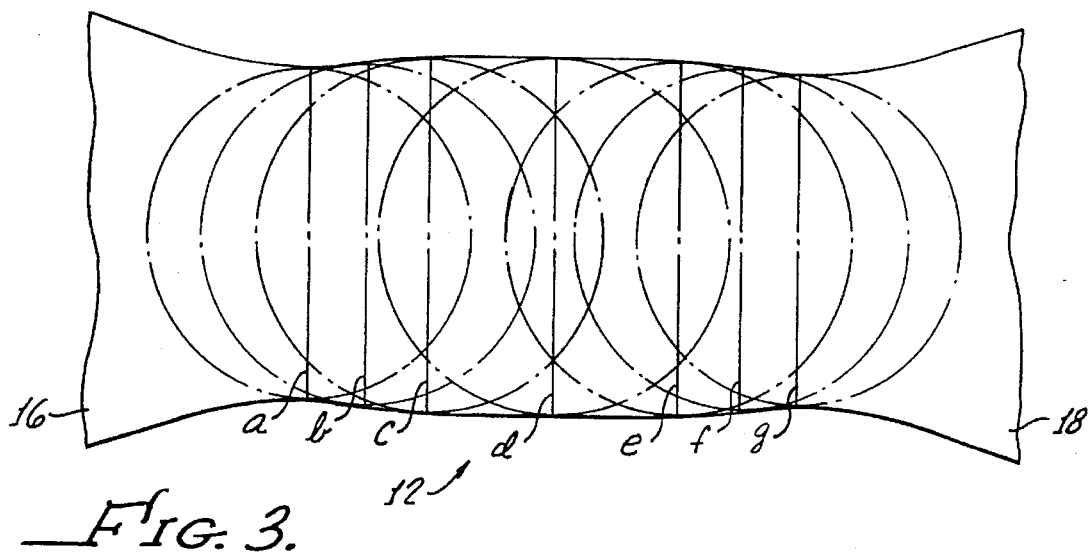
FIG. 3 is an enlarged view of a portion of FIG. 2, and showing hypothetical lines and circles.

The present method and article employ sheet metal (including bendable metal plate) that can be bent past is elastic limit so as to remain in bent condition. Thus, springs are excluded. Typical metals which may be formed in accordance with the present invention are sheet steel, sheet stainless steel, sheet aluminum, steel plate, etc.

For simplicity, and in accordance with the preferred forms of the present invention, the illustrated articles are elongate sheet metal articles that are symmetrical about longitudinal axes.

For simplicity and clarity of description, the word "element" is used in the specification and claims. At least as employed in this specification and claims, an "element" of (for example) a cylinder is one of an infinite number of imaginary straight lines that lie on the surface of the cylinder and are parallel to the axis of the cylinder. The elements terminate at the ends of the cylinder (edges of the part). The word "cylinder" denotes a right circular cylinder, namely the conventional meaning of the word.

Referring to FIGS. 1 and 2, there is shown in FIG. 2, in flat condition, an elongate piece of sheet metal that is symmetrical about a center line "CL", such center line being perpendicular to the longitudinal axis of the piece and midway between the ends of the piece. The sheet metal piece has a left section 10, a right section 11, and a center section 12. Left and right sections 10, 11 extend equal distances from opposite ends of center section 12. Left and right sections 10, 11 are bent by tools at the factory into portions of a desired curved geometric shape; they are made sufficiently strong that after bending at the factory they will not bend in the field. Center section 12 is made less strong and does bend in the field, without need for a die or mandrel, into another portion of such desired curved geometric shape.

The indicated strengths of sections 10, 11 are preferably achieved by making them wider than center section 12. However, other means of increasing the strengths of sections 10, 11 may be employed, such as making them longitudinally flanged, or longitudinally grooved, or thickened.

Holes 13, 14 are punched through sections 10, 11 at equal distances from opposite ends of center section 12, on the longitudinal axis of the piece. The holes are used in finished products an exemplary one of which is described toward the end of this specification.

The elongate piece shown in FIG. 2, having been first blanked and pierced to achieve the shape of FIG. 2, is then formed at the factory in a punch-press by suitable male and female tools. It is formed into (for example) the outer (open) shape shown by solid lines in FIG. 1. Such outer shape is such that the male punch may be removed easily, there being no undercut.

Referring again to the outer portion of FIG. 1, the shape to which the sheet metal piece is formed at the factory, in a punch-press (or other tooling), has the center section 12 that remains substantially flat, in the preferred embodiment. Left section 10 is formed, at its region closest to center section 12, into an arc 16 of a cylinder of desired diameter. The region of left section 10 remote from center section 12 is left straight, to form the straight section 17 that is bent outwardly at a relatively sharp angle to the arc end remote from the center section. Left section 10 merges gradually with center section 12.

The preformed (outer) part shown in FIG. 2 being symmetrical about the center line, right section 11 has a corresponding arc 18 and corresponding straight section 19.

There are smooth transitions between the ends of center section 12 and the portions of arcs 16, 18 adjacent such ends.

The factory-formed part is then shipped to the customer for further bending in the field.

Throughout the remainder of this specification and claims, it will be assumed that the article (and other articles made in accordance with the invention) is shipped to the field in the open condition shown (for example) by the outer portion of FIG. 1. (It is to be understood, however, that it would be possible to perform an additional step at the factory and a corresponding additional step in the field. Such additional step at the factory would be to move the straight portions 17, 19 towards each other, for example as described below relative to operations in the field. Then, in the field, such portions would be moved apart prior to being moved towards each other again so as to enclose a product such as a tube, hose, cable, etc.)

In the field, inwardly-directed forces $P_S$—$P_S$ are applied to the outer ends of straight portions 17, 19 as indicated in FIG. 1, either manually (if the part is sufficiently small) or by use of a suitable tool (if the part is larger or too strong for manual operation). For many parts, forming in the field may be done manually by a normal adult man or woman.

There is therefore a force line $P_S$—$P_S$ through the ends of the part, and when sufficient force is applied therealong, in opposite directions, center section 12 is caused to bend into the configuration shown by phantom lines toward the center of FIG. 1, this being an arc—numbered 20—of a cylinder having the same or substantially the same radius as that of arc 16 and arc 18. The three arcs are circumferentially adjacent. There is, accordingly, formed a very large portion of a single cylinder that fits substantially continuously around the surface configuration of the tube, etc., to be enclosed by the present article. In the illustration described toward the end of this specification, the enclosed product is a rail 21 on a boat, such rail having a diameter of (for example) 1.0 inch.

To cause center section 12 to bend into cylindrical arc portion 20 instead of randomly, such center section is stamped (or otherwise made) into a predetermined shape carefully constructed such that the desired arc will result.

Referring to FIG. 3, the above-described desired results are achieved by causing the lengths of the elements at opposite ends of center section 12 to be relatively short, and also by causing the lengths of the elements to progressively increase as the center line CL is approached. Stated otherwise, in the present embodiment, center section 12 is narrowest at opposite ends thereof and widest in the middle region, being progressively wider as the middle (center line CL) is approached.

According to the best understanding of the inventor, the moments created by application of inwardly-directed forces along force line $P_S$—$P_S$ create, initially, the greatest stresses at opposite ends of the center section 12, namely at elements a and g that are shortest, as shown in FIG. 3. It is to be understood that "stress" means force per unit area, in the center section, but since each element is infinitely narrow the "area" of each element may be considered as being the length of that element.

Immediately after the initial bends have occurred at elements a and g, bends occur at adjacent elements that are nearer the center line. Exemplary ones of such elements are b and f, and other exemplary ones are c and e. b and f, and c and e, are mirror images of each other about the center line. It is to be understood, however, there are very many other elements that are not specifically indicated. The bending is progressive, uniform and cylindrical, starting at a and g and progressing inwardly toward center element d.

It is believed by the inventor that the reason the cylindrical configuration results in center section 12 is that the moment arms become progressively longer as bending occurs, and also because center section 12 becomes progressively wider (elements become progressively longer) as center element d is approached. Thus, there is the same stress each time and accordingly the same amount of strain (bending). The moment arms from the specified force-application points, namely the extreme ends of the sheet metal piece, are relatively small when the piece is in open (preliminarily formed) condition. Thus, force line $P_S$—$P_S$ is quite near the bend regions. By the time the field-forming is completed, the force line—shown at $P_f$—$P_f$—is relatively far from the bend regions. The moment arms increased progressively during the entire bend.

Outer elements a and g in FIG. 2a are made of such length, as above stated, that bending will first occur there when sufficient inward forces are applied at and along $P_S$—$P_S$ of the open part shown in FIG. 1. The bending that results causes an incremental increase in the length of each moment arm, so that when (for example) elements b and f are reached the combination of the incrementally increased-length moment arms and the incrementally longer elements (increased widths) at b and f result in stresses and strains at b and f that correspond to the stresses and strains at a and g.

Accordingly, they create at b and f bend regions that correspond to the a and g bend regions. The same is believed to be true relative to all other portions of the center section 12, until the final cylinder-arc bends are made adjacent center element d.

It is emphasized that changing the length of each of the elements (that is to say, changing the width of the part), in combination with the inwardly-directed forces (moments) applied at predetermined points, control the form of the part.

Bending is continued until the outer surface of the enclosed rail 21 (for example) is engaged. Although the rail is engaged (or nearly so), it is not needed for the bending and normally plays no part in the bending. The present girdling article is accordingly mounted on the rail 21 and is ready for assembly with other parts as described toward the end of this specification. The amount of force applied is just enough to cause bending. Thus, for example, when bending in the field is manual (no tools) the thumb is applied at one end of the part, and the fingers of the same hand are applied at the other end. Then "pinching" forces are applied to effect the entire field-forming generation. The force line moves progressively from $P_S$—$P_S$ to $P_f$—$P_f$, with the moment arms progressively increasing.

As a specific example, the sheet metal blank shown in FIG. 2 has a length (when flat) of 3.782 inches. As above stated, left and right sections 10, 11 may have any widths or shapes so long as they are sufficiently strong that they do not bend in the field. The length, longitudinally of the piece of sheet metal, of center section 12 is 0.684 inch. The elements a–g, inclusive, are shown in FIG. 3 as being the diameters of imaginary circles. Each element a and g is 0.460 inch long, and each is spaced 0.342 inch from the CL. Each element b and f is 0.472 inch long, and each is spaced 0.270 inch from the CL. Each element c and e is 0.487 inch long, and each is spaced 0.180 inch from the CL. Element d is at the CL, and is 0.50 long. The radius of each arc 16 and 18 is 0.5 inch. The angle between horizontal (in FIG. 2) and each straight section 17, 19 is 52 degrees. The thickness of the stock is 0.048 inch. It is 18-8 stainless steel.

Figure 6:
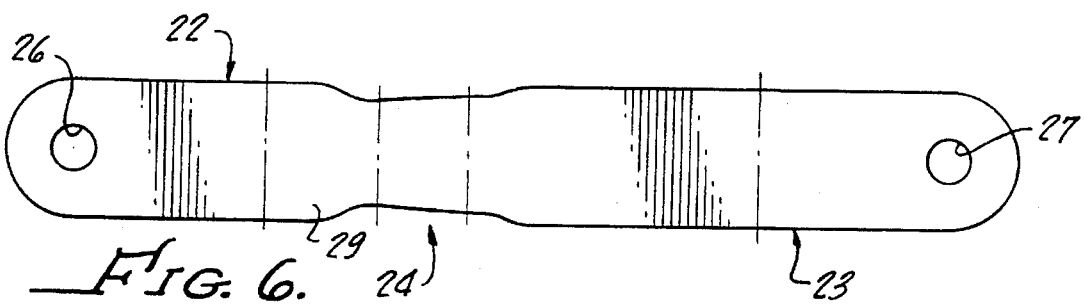
FIG. 6 is a plan view showing in flat condition the girdling article of a second embodiment of the invention.
Figures 7, 8:
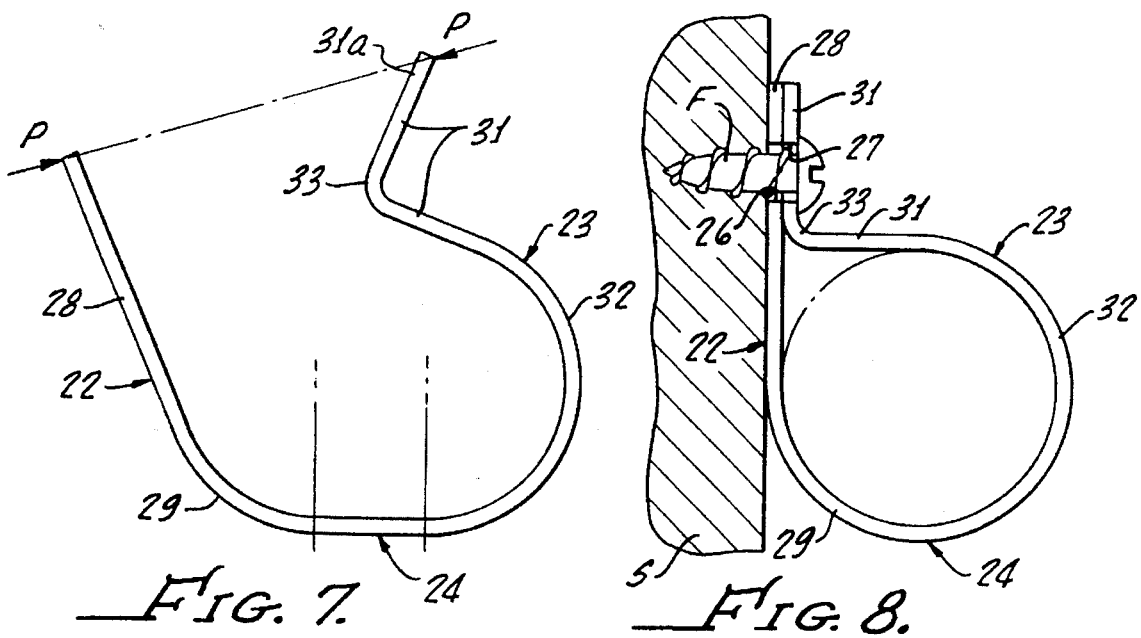
FIG. 7 is an elevational view showing the shape to which the article of FIG. 6 is formed at the factory.
FIG. 8 is an elevational view showing the shape to which the article of FIG. 7 is formed in the field.

Embodiment of FIGS. 6–8:

Referring next to FIGS. 6–8, there is shown an embodiment that is asymmetrical. The illustrated product is a "b" bracket such as is adapted to connect pipes, tubes, cables, hoses, etc., to a support or to another such pipe, etc.

An elongate flat piece of sheet metal is first blanked and pierced as shown in FIG. 6, in a suitable punch-press. Thereafter, the piece shown in FIG. 6 is bent into the configuration shown in FIG. 7, this being done at the factory by suitable tooling means. Thereafter, in the field, the ends are pushed towards each other, by forces applied at P and P, to result in the product shown in FIG. 8. A fastener "F" is then extended through registered holes and employed to connect the encircled pipe or other product to a support or to another such product. A vertical wooden support S is indicated.

The sheet metal element has, as shown in FIG. 6, a left section 22, a right section 23 and a "center" or intermediate section 24. As in the case of the previous embodiment, left and right sections 22, 23 are made sufficiently strong that they will not bend in the field. Two holes 26, 27 are punched into the end portions of left and right sections 22, 23, at corresponding points (along the longitudinal axis) equidistant from the ends of the piece.

The preliminary shape, that is to say the part as preliminarily formed at the factory, has (FIG. 7) at its left section 22 (FIG. 7) a straight part 28 and a curved or radiused part 29. Part 29 has a portion adjacent straight part 28 that is curved so as to merge gradually with such straight part. Curved part 29 has a portion adjacent center section 24 that merges gradually and progressively therewith.

The curved part 29 is an arc of a curved geometric figure such as a cylinder, for example a 1-inch diameter cylinder where the enclosed pipe, etc., has an outer diameter of 1 inch. In the present embodiment, the curved part 29 is quite small since a large portion of left section 22 is taken up by straight part 28.

The right section 23 has a straight part 31 and a curved part 32, the straight part being remote from center section 24 as is the case relative to straight part 28. Straight part 31 is bent at a right angle 33, which is located approximately at the center of the straight part, so as to form an upwardly-extending end portion.

The curved part 32 is large in comparison to curved part 29, and has the same radius as part 29 (for example, ½ inch). The ends of curved part 32 merge smoothly and gradually width the adjacent straight part 31 and the center section 24. The center section 24 is left substantially flat.

The width of the piece (lengths of the elements) is least at the ends of intermediate section 24, but is not symmetrical relative to the center of such section 24. This is because the moment arms are different on opposite sides of section 24. The upper and lower edges of the center section (FIG. 6) are outwardly convex in a manner corresponding to each other and calculated to achieve the cylindrical arc upon forming in the field. Such lengths are adapted to cause bending of center section 24 into an arc of a cylinder that corresponds to and merges with the arcs or curved portions 29 and 32 on opposite sides of the center section. Reference is made to the lower portion of FIG. 8.

The pre-formed part of FIG. 7, in the preferred embodiment, is gently pushed onto a pipe, etc., when it is desired to support such a product or connect such a product to another product. The distance between the angle 33 and the straight portion 28 directly opposite thereto (FIG. 7) is less than the outer diameter of the pipe, etc., but only a small amount less, so that the present article may be popped onto the pipe. There it will hang, without manual support, until the oppositely-directed forces are applied, at P—P, (FIG. 7) to bring the straight ends together and, simultaneously, curve into an arc of a cylinder the straight section 24.

Thereafter, the screw F or other fastener is inserted through the registered holes 26 and 27 (FIG. 8) and is connected with the support S. The holes are registered with each other because of the perfection and uniformity of the bending operation. Alternatively, the screw or other fastener may be connected to a second bracket corresponding to the present one, so that two pipes, are connected to each other.

The invention has been described primarily relative to cylindrical shapes, but is believed that other curved shapes (such as elliptical) can also be achieved by adjusting the lengths of the elements in the intermediate section.

The use of the word "center" in this specification, relative to the location of section 12 and section 24 is not to be considered as being a limitation, but instead as indicating that such section is between the remaining sections (such as 22 and 23 in the second embodiment).

Assembly Including The Bracket Of FIGS. 1 And 2

Referring to FIGS. 3 and 4, the formed piece (bracket) of the first embodiment is shown as mounting an aladdin cleat 41 that is (per se) of conventional construction. Cleat 41 is a metal or synthetic resin element and has a body section that just fits between the straight ends 17, 19 after bending has been completed in the field. Such ends are parallel to each as shown in FIG. 5 and in the central view of FIG. 1. It is then merely necessary to insert screws 42 through holes 13, 14 (FIG. 2) and thread such screws into an internally-threaded bore in the body of the aladdin cleat 41. The screws hold the ends 17, 19 parallel despite a tendency toward some spring back.

Two longitudinally spaced set screws 43 are threaded downwardly through the body of cleat 41 and into bearing engagement with the upper surface of rail 21, between ends 17 and 19. These screws prevent the cleat 41 from slipping or pivoting; they cooperate with the formed bracket in achieving a rigid mounting.

In a very short period of time, the bracket of the first embodiment may be manually bent onto the rail 21, following which the screws 42 are inserted and tightened, following which set screws 43 are tightened into bearing engagement with the upper rail surface. The mounting is independent of the length of the rail, and of any flanges or other obstacles that may be present on the rail.

The foregoing detailed description is to be clearly understood as given by way of illustration and example only, the spirit and scope of this invention being limited solely by the appended claims.

What is claimed is:

1. A method of partially creating a sheet metal article having, at least in part, a continuously curving geometric shape, said method comprising:
   (a) providing an elongate piece of sheet metal having a left section, a right section, and an intermediate section, said sheet metal being one that is readily bent past its elastic limit so that it will remain in bent condition after being bent,
   (b) causing said left and right sections to be stronger than said intermediate section, so that forces applied to said left and right sections will result in bending of said intermediate section, and
   (c) causing said intermediate section to have such a configuration that sufficient forces applied to said left and right sections will, without any mandrel or dies, cause said intermediate section to assume a predetermined desired continuously curved geometric shape and to remain in such shape after discontinuance of such forces.

2. The invention as claimed in claim 1, in which said geometric shape is an arc of a cylinder having a predetermined diameter.

3. The invention as claimed in claim 2, in which said piece of sheet metal has a longitudinal axis, and in which said step (c) includes causing edge portions of said intermediate section, on opposite sides of said axis, to be convex.

4. A sheet metal girdling article constructed by the method recited in claim 1.

5. A method of partially creating a sheet metal article having, at least in part, a continuously curving geometric shape, said method comprising:
   (a) providing an elongate piece of sheet metal having a left section, a right section, and an intermediate section, said piece of sheet metal having a longitudinal axis, said sheet metal being one that is readily bent past its elastic limit so that it will remain in bent condition after being bent,
   (b) causing said left and right sections to be stronger than said intermediate section, so that forces applied to said left and right sections will result in bending of said intermediate section, and
   (c) causing said intermediate section to have such a configuration that sufficient forces applied to said left and right sections will cause said intermediate section to assume a predetermined desired continuously curved geometric shape and to remain in such shape after discontinuance of such forces,
   said geometric shape being an arc of a cylinder having a predetermined diameter,
   said step (c) further including causing edge portions of said intermediate section, on opposite sides of said axis, to be convex, and
   said method further comprising causing said convex edge portions to have predetermined curved shapes calculated to make said geometric shape said arc of a cylinder when said forces are applied to said left and right sections.

6. A method of partially forming a girdling article that is readily mounted closely around a pipe, cable, hose, etc., regardless of the length of said pipe, etc., and regardless of flanges or other obstructions thereon, said method comprising:
   (a) providing an elongate piece of sheet metal adapted to bend into a desired shape and to remain so bent,
   (b) pre-forming said piece at a factory, by means of tools, to cause at least part of said piece to assume the final desired shape of a portion of said article, and
   (c) causing another part of said piece to have such a surface configuration that it will bend in the field, in response to application of forces to said piece, and without use of dies or mandrels, into a predetermined desired continuously curved final geometric shape having a predetermined desired radius.

7. The invention as claimed in claim 6, in which said final geometric shape of said other part is an arc of a cylinder.

8. The invention as claimed in claim 6, in which said method further comprises causing said first-mentioned part to be adjacent said other part and to merge smoothly therewith without any sharp bend.

9. The invention as claimed in claim 8, in which said final desired shape of said first-mentioned part, and said final geometric shape of said other part, are arcs of the same cylinder so that both of said parts will combine with each other, after said bending in the field, to create large arc of the same cylinder.

10. A method of girdling with a piece of sheet metal an elongate object in the field, without regard to the length of said object or to obstruction thereon, said method comprising:
    (a) providing an elongate piece of sheet metal that is adapted to bend and remain bent,
    (b) causing a part of said piece to have such a shape that when said part is bent in the field, without need for mandrels or dies, said part will bend into a predetermined curved geometric configuration adapted to fit partially around said elongate object,
    (c) causing a second part of said piece to have, at the factory, a predetermined curved geometric configuration adapted to fit partially around said elongate object, and
    (d) applying, in the field, force to said second part to cause said first-mentioned part to assume said first-mentioned predetermined curved geometric configuration, and
    (e) mounting said piece around said elongate object.

11. The invention as claimed in claim 10, in which said geometric configuration of both said first-mentioned and second parts is an arc of substantially the same cylinder.

12. The invention as claimed in claim 10, in which said shape referred to in clause (b) comprises convex edges on opposite sides of a longitudinal axis of said piece.

13. A sheet metal girdling article constructed by the method recited in claim 10.

14. The invention as claimed in claim 13, in which said article further comprises an aladdin cleat and two set screws to relate such clamp to a support.

15. The invention as claimed in claim 13, in which said article is an asymmetrical "b" bracket.

16. A method of forming articles, which comprises:
(a) blanking an elongate piece of sheet metal having a left section, a right section, and an intermediate section,
(b) causing said left and right sections to be sufficiently strong that application of torque to the ends of said left and right sections will, in the absence of tools, cause said intermediate section, and not said left and right sections, to bend,
(c) bending, at the factory, by use of tools, said left and right sections upwardly from said intermediate section to predetermined bent positions,
whereby subsequent application of inwardly-directed forces to the ends of said left and right sections will cause bending of said intermediate section, and
(d) so shaping the configuration of said intermediate section that said application of inwardly-directly forces to said ends will cause said intermediate section to bend, without need for a die or mandrel, into a predetermined curved geometric shape and not randomly.

17. The invention as claimed in claim 16, in which said method further comprises causing said shaping step (d) to be such that said predetermined curved geometric shape is an arc of a cylinder.

18. The invention as claimed in claim 16, in which said bending step (c) further comprises causing said left and right sections to also have, at least in part, predetermined curved geometric shapes.

19. The invention as claimed in claim 18, in which all of said predetermined curved geometric shapes are arcs of substantially the same cylinder.

20. The invention as claimed in claim 16, in which said surface configuration includes convex edge portions on opposite sides of the axis of said intermediate section.

21. The invention as claimed in claim 16, in which said step (c) further comprises causing the moment arms of said inwardly-directed forces, as said intermediate section bends, to progressively increase in length as bending progresses during step (d).

22. The invention as claimed in claim 16, in which method further comprises effecting said subsequent application of inwardly-directed forces to occur while said piece is in partially girdling relationship with an elongate object.

* * * * *